United States Patent [19]
Vesterlund et al.

[11] Patent Number: 5,654,993
[45] Date of Patent: Aug. 5, 1997

[54] FUEL ELEMENT FOR PRESSURIZED—WATER REACTOR WITH GUIDE TUBES FINALLY HEAT-TREATED IN TWO STEPS

[75] Inventors: Gunnar Vesterlund; Mats Dahlbäck, both of Västerås, Sweden

[73] Assignee: ABB Atom AB, Västerås, Sweden

[21] Appl. No.: 564,191

[22] PCT Filed: Jun. 29, 1994

[86] PCT No.: PCT/SE94/00644

§ 371 Date: Dec. 18, 1995

§ 102(e) Date: Dec. 18, 1995

[87] PCT Pub. No.: WO95/01639

PCT Pub. Date: Jan. 12, 1995

[30] Foreign Application Priority Data

Jun. 30, 1993 [SE] Sweden .................. 9302251

[51] Int. Cl.⁶ .................. G21C 3/32; G21C 3/06
[52] U.S. Cl. .................. 376/449
[58] Field of Search .................. 376/260, 261, 376/353, 449, 457; 148/672; 420/422

[56] References Cited

U.S. PATENT DOCUMENTS

| | | | |
|---|---|---|---|
| 2,924,518 | 2/1960 | Raine et al. | 420/423 |
| 4,360,389 | 11/1982 | Urquhart | 376/900 |
| 4,649,023 | 3/1987 | Sabol et al. | 420/422 |
| 4,770,847 | 9/1988 | Plaza-Meyer et al. | 376/444 |
| 4,938,921 | 7/1990 | Mardon et al. | 376/457 |
| 5,230,758 | 7/1993 | Foster et al. | 148/672 |

FOREIGN PATENT DOCUMENTS

B463790   1/1991   Sweden .

*Primary Examiner*—Daniel D. Wasil
*Attorney, Agent, or Firm*—Watson Cole Stevens Davis, P.L.L.C.

[57] ABSTRACT

The invention relates to a fuel element for a pressurized-water reactor comprising a number of fuel rods arranged in a square lattice and wherein certain positions in the lattice contain guide tubes for receiving control rods, wherein the fuel element can be used for higher burnup by manufacturing the guide tubes of the element such that their irradiation-induced growth is reduced and their corrosion resistance is increased compared with conventionally manufactured guide tubes. This is achieved by finally heat-treating the guide tubes in two steps, the first step being a beta quenching and the second step a heat treatment in the alpha-phase region.

5 Claims, 2 Drawing Sheets

FUEL ELEMENT FOR PRESSURIZED-WATER REACTOR WITH GUIDE TUBES FINALLY HEAT-TREATED IN TWO STEPS

TECHNICAL FIELD

The present invention relates to the field of fuel elements for a pressurized-water reactor (PWR), the fuel element comprising a number of fuel rods arranged in a square lattice and wherein certain positions in the lattice contain guide tubes for receiving control rods.

The invention also comprises a method for manufacturing guide tubes.

BACKGROUND ART, PROBLEMS

A PWR fuel element is composed of a frame consisting of a top nozzle, a bottom nozzle, spacers, and guide tubes (or thimbles) and is filled with fuel rods. The size of a PWR lattice may vary from 14×14 to 19×19 rods. The primary function of the guide tubes is to provide space for control rods but they also function as supporting rods in the fuel assembly and as spacer holder rods. Usually, the guide tubes are made from a zirconium alloy of the same type as the cladding of the fuel rods.

During operation in a reactor, an extension of cladding and guide tubes takes place because of irradiation-induced growth. The growth is caused by radiation damage in the microstructure arranging itself in certain crystal planes in the hexagonal zirconium lattice and by the fact that the material therefore will grow perpendicular to these planes. The growth means that the fuel element all the time is extended under irradiation and that the element, after a certain irradiation, may become longer than the available space between the upper and lower core plates with an ensuing risk of the element bending or breaking. This means that the burnup of the element, which determines the residence time of the element in the core, must be limited.

The fuel element is designed such that the fuel rods are somewhat shorter than the space between the top and bottom nozzles, to provide a certain space for the fuel rods in which to grow. The guide tubes which serve as supporting rods are longer and must be attached to the top and bottom nozzles to hold the bundle together. In current designs, therefore, the growth of the guide tubes is determining for the burnup for which a fuel element can be designed.

According to EP-B-0 296 972, it is known to heat-treat cladding tubes for PWR fuel to reduce the corrosion and also the growth in the axial direction by heating the cladding tube to a temperature in the interval 950° C. to 1250° C., as a last step in the manufacture, and then rapidly cooling the tube, so-called beta-quenching. According to the patent the cladding shall be of a zirconium alloy, preferably Zircaloy-4 and of a certain composition within the scope of the specification for that alloy.

For fuel elements intended for boiling water reactors, BWR, it is known, according to U.S. Pat. No. 4,770,847, that fuel rods have a faster growth than water rods. To achieve a uniform growth of fuel rods and water rods, it is stated that a cladding tube with less tendency to grow can be manufactured by cold-working in a final step to achieve a suitable dimension, followed by heat treatment at about 538°–705° C. for 1 to 15 hours. A water rod with a somewhat higher tendency to grow is manufactured by heat-treating the tube, after cold working, at 440°–510° C. for 1 to 4 hours.

SUMMARY OF THE INVENTION

According to the present invention, a fuel element for a PWR is obtained which can be utilized for higher burnup than what current technique allows, by making the guide tubes of the element less inclined to grow and at the same time corrosion-resistant.

This can be achieved according to what is stated in the claims.

In the manufacture of guide tubes, at the dimensionally final state of the main part of the tube or after all the desired dimensions of the tube have been attained, the tube is to be beta-quenched by being heated to a temperature in the beta-phase region, 950° to 1200° C., and then be rapidly cooled. The beta-quenching operation can also be carried out in such a way that only part of the tube wall undergoes phase transformation to beta phase. After the beta-quenching operation, at least one additional heat treatment is to be carried out by heat-treating the guide tube in the alpha-phase temperature region, below about 840° C.

Beta-quenching of the guide tube in the final dimension has a favourable influence on the growth properties, but, on the other hand, the corrosion properties of the guide tube will deteriorate by such heat treatment. According to the present invention, it has proved possible, by beta-quenching a guide tube in the finished dimension, or with the main part of the tube in the finished dimension, and thereafter by heat-treating the tube in the alpha-phase region, to considerably improve the corrosion properties of the tube and to obtain a favourable influence on the growth properties. The heat treatment for a tube, which has been beta-quenched when the main part of the tube is in the finished dimension, can be carried out either directly after the beta quenching or after all the desired dimensions of the tube are completed. The final heat treatment preferably takes place at 600° to 800° C.

A plurality of heat treatments in the alpha-phase region can be carried out after the beta quenching.

The heat treatment can be carried out in such a way that the guide tube is subjected to a slow increase in temperature up to the desired heat-treatment temperature below 840° C. and preferably to a temperature in the interval 600° to 800° C. The tube can also first be heat-treated at a lower temperature and then at a somewhat higher temperature, whereby the lower temperature may be lower than 600° C. and the higher be in the interval 600° to 840° C. By carrying out the heat treatment by means of slow temperature increase or by means of stepwise heat treatments at successively higher temperature, a favourable redistribution of alloying elements between matrix and secondary phases can be made.

An additional advantage of the present invention is that the cladding of the fuel rods need not be heat-treated in a similar manner, but these can be made without being beta-quenched in the finished or almost finished dimension. Beta quenching of a cladding in the finished dimension is a complicated process and it is therefore advantageous that only a small number of tubes in the bundle require this heat treatment in order to obtain favourable growth properties in the entire bundle and thus to be able to utilize the bundle for higher burnup.

The guide tubes are manufactured from a zirconium alloy. Examples of zirconium alloys are Zircaloy-2 and Zircaloy-4, the compositions of which are:

| Zircaloy-2 | Sn | 1.2–1.7 percent by weight |
| | Fe | 0.07–0.20 percent by weight |
| | Cr | 0.05–0.15 percent by weight |

| | | |
|---|---|---|
| | Ni | 0.03–0.08 percent by weight |
| | Si | max. 120 ppm |
| | Zr | balance + impurities |
| Zircaloy-4 | Sn | 1.2 –1.7 percent by weight |
| | Fe | 0.18–0.24 percent by weight |
| | Cr | 0.07–0.13 percent by weight |
| | Zr | balance + impurities |

Other suitable zirconium alloys for manufacturing guide tubes are an alloy with zirconium and 1–2.0% Sn, 0.07–0.70% Fe, 0.05–0.15% Cr, 0.06–0.40% Ni, 0.015–0.20% Nb, 0.09–0.16% O, or an alloy with zirconium and 1–2.0% Sn, 0.07–0.70% Fe, 0.05– 0.15% Cr, 0.16–0.40% Ni, 0.015–0.20% Nb, 0.015–0.05% Si, 0.09–0.16% O.

Also other zirconium-niobium alloys such as Zr-1.0 Nb, -1.0 Sn, -0.1 Fe, or other zirconium alloys are applicable for use according to the invention.

DESCRIPTION OF THE PREFERRED EMBODIMENTS

Figure 1:
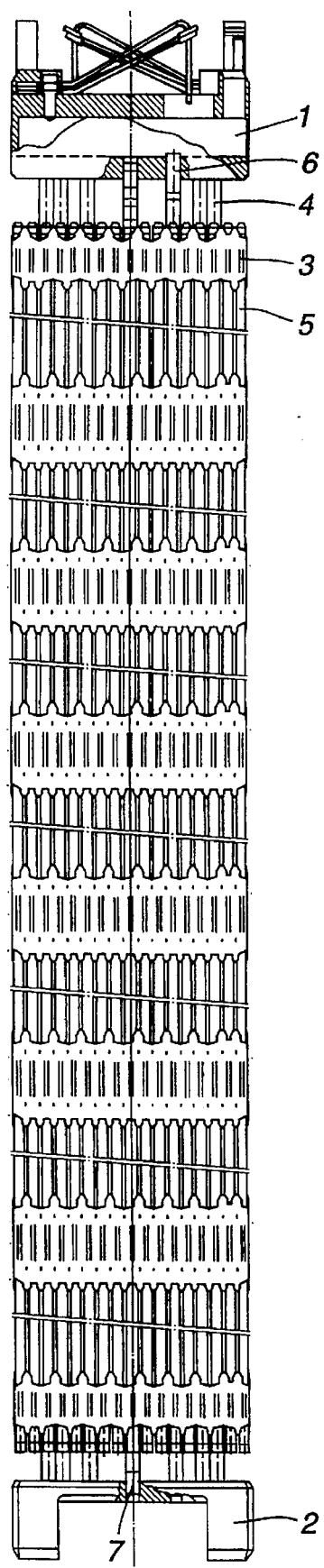
FIG. 1 shows a PWR fuel element seen from the side.

FIG. 1 shows a 17×17 bundle. The top nozzle 1, the bottom nozzle 2 and the spacers 3 form together with the guide tubes 4 a frame in which the fuel rods 5 are arranged. The guide tubes 4 are fixed at 6 and 7 to the top and bottom nozzles 1 and 2. The rods 5 are arranged such that their length is smaller than the length between the top and bottom nozzles. In this way, the rods may grow to a certain length without running the risk of bending. The whole fuel element is inserted into the core between a top and a bottom plate (not shown in the figure. If growing of the guide tubes leads to extension of the entire bundle, such that the top nozzle contacts the upper top plate, the bundle may become damaged.

Figure 2:
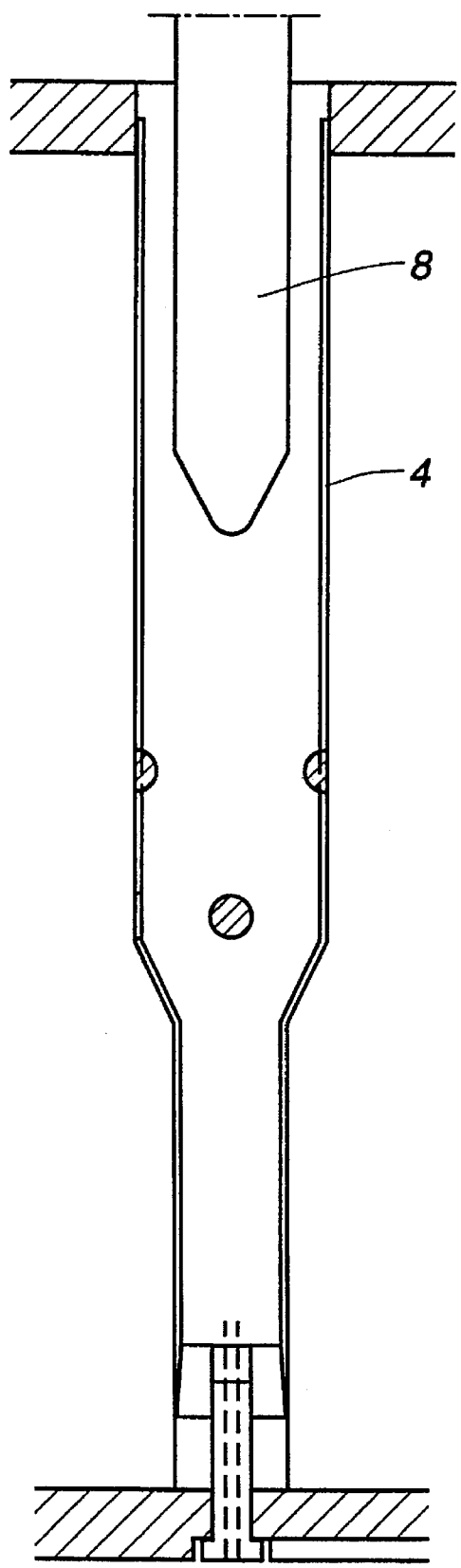
FIG. 2 shows a guide tube with two dimensions in cross section.

FIG. 2 shows a cross section of a guide tube 4, the diameter of which has two dimensions. Guide tubes with several diameter dimensions other than two may also be used. The guide tube is to accommodate the control rods 8 and is usually designed with two or more diameters to facilitate the insertion of the control rod into the assembly.

The guide tube is manufactured in a similar manner as cladding tubes by extrusion and a number of cold-rolling steps with intermediate heat-treating operations.

In the finished dimension, or when the main part of the tube is in the finished dimension, that is, before reduction and/or extension of part of the diameter of the guide tube, the guide tube is to be beta-quenched. This is performed by heating the tube to 950° to 1200° C., for example by means of high-frequency heating and then rapidly cooling the tube at a cooling rate in the range of 10° to 200° C./second. The beta quenching can also comprise only about 50% of the wall thickness of the tube and the remaining part of the tube remains unaffected by the heating. After beta quenching, the tube is to be heat-treated in the alpha-phase region. This heat treatment may take place in the interval 600° to 800° C., for example at 700° C., for two hours.

We claim:

1. A pressurized-water reactor fuel element comprising a top nozzle, a bottom nozzle, spacers, and guide tubes, which together form a frame, and fuel rods, comprising a cladding filled with cylindrical fuel pellets, arranged in the frame in a substantially square lattice, characterized in that the guide tubes, before having been mounted in the frame, were finally heat-treated in two steps, a first step comprising a beta quenching carried out in the finished dimension or when the main part of the tube is in the finished dimension, and a second step comprising at least one heat treatment in the alpha-phase temperature region, below 840° C.

2. A fuel element according to claim 1, characterized in that the heat treatment in the alpha-phase region is carried out with an increase in temperature, or that the heat treatment is carried out first at a lower temperature, below 600° C., and then at a higher temperature, below 840° C.

3. A fuel element according to claim 1, characterized in that the heat treatment in the alpha-phase region is carried out at 600° to 800° C.

4. A fuel element according to claim 1, characterized in that the beta quenching is carried out in such a way that only part of the tube wall undergoes phase transformation.

5. A fuel element according to claim 1, characterized in that the fuel rods of the element comprise a cladding, for the completion of which final heat treatment is carried out in the alpha-phase region only.

* * * * *